US006798901B1

(12) United States Patent
Acharya et al.

(10) Patent No.: US 6,798,901 B1
(45) Date of Patent: Sep. 28, 2004

(54) METHOD OF COMPRESSING A COLOR IMAGE

(75) Inventors: Tinku Acharya, Chandler, AZ (US); Niloy J. Mitra, West Bengal, IN (US); Prabir K. Biswas, West Bengal, IN (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/411,697

(22) Filed: Oct. 1, 1999

(51) Int. Cl.[7] .................................................. G06K 9/00
(52) U.S. Cl. ..................................... 382/166; 382/232
(58) Field of Search ................................ 382/240, 166, 382/248, 164, 238, 232; 375/240.19, 240.11; 348/398.1, 409.1, 395.1, 394.1, 400.1, 391.1, 397.1

(56) References Cited

U.S. PATENT DOCUMENTS

| 5,293,228 | A | * | 3/1994 | Marti ....................... 348/391.1 |
| 5,428,465 | A | * | 6/1995 | Kanamori et al. .......... 358/518 |
| 5,875,122 | A | | 2/1999 | Acharya |
| 5,956,467 | A | * | 9/1999 | Rabbani et al. ............. 382/166 |
| 5,995,210 | A | | 11/1999 | Acharya |
| 6,009,201 | A | | 12/1999 | Acharya |
| 6,009,206 | A | | 12/1999 | Acharya |
| 6,047,303 | A | | 4/2000 | Acharya |
| 6,289,131 | B1 | * | 9/2001 | Ishikawa .................... 382/232 |

OTHER PUBLICATIONS

Marino et al. "A DWT–based perceptually lossless color image compression architecture." Conference Record of the Thirty–Second Asilomar Conference on Signals, Systems & Computers, 1998. Nov. 1–4, 1998. p. 149–153 vol. 1.*

U.S. patent application Ser. No. 09/519,874, Acharya et al., filed Mar. 6, 2000.
U.S. patent application Ser. No. 09/461,080, Acharya, filed Dec. 14, 1999.
U.S. patent application Ser. No. 09/461,068, Acharya, filed Dec. 14, 1999.
U.S. patent application Ser. No. 09/432,337, Acharya, filed Nov. 2, 1999.
U.S. patent application Ser. No. 09/429,058, Acharya et al., filed Oct. 29, 1999.
U.S. patent application Ser. No. 09/467,487, Acharya et al., filed Dec. 20, 1999.
U.S. patent application Ser. No. 09/467,611, Acharya et al., filed Dec. 20, 1999.

(List continued on next page.)

*Primary Examiner*—Amelia M. Au
*Assistant Examiner*—Colin LaRose
(74) *Attorney, Agent, or Firm*—George Chen

(57) ABSTRACT

In accordance with one embodiment of the invention, a method of compressing a color image includes the following. The wavelet transform of each of the respective color planes of the color image is computed. One of the respective wavelet transformed color plane frames is encoded. For the other two respective wavelet transformed color plane frames, a prediction coefficient from at least one of subbands of each color plane thereof is computed. In accordance with another embodiment of the invention, a method of decompressing a compressed color image includes the following. The compressed color image includes at least an encoded frame for one color plane of the color image and prediction coefficients for the other two color plane frames of the color image. The one color plane frame of the color image is reconstructed from the encoded frame. The other two color plane frames of the color image are at least partially reconstructed from the reconstructed one color plane frame and the prediction coefficients.

30 Claims, 5 Drawing Sheets

OTHER PUBLICATIONS

U.S. patent application Ser. No. 09/473,643, Acharya et al., filed Dec. 28, 1999.
U.S. patent application Ser. No. 09/494,087, Acharya, filed Jan. 28, 2000.
U.S. patent application Ser. No. 09/507,213, Acharya et al., filed Feb. 25, 2000.
U.S. patent application Ser. No. 09/519,135, Acharya et al., filed Mar. 6, 2000.
U.S. patent application Ser. No. 09/383,117, Acharya et al., filed Aug. 25, 1999.
U.S. patent application Ser. No. 09/291,810, Acharya, filed Apr. 14,1999.
U.S. patent application Ser. No. 09/292,763, Acharya et al., filed Apr. 14, 1999.
U.S. patent application Ser. No. 09/390,255, Acharya et al., filed Sep. 3, 1999.
U.S. patent application Ser. No. 09/329,632, Acharya et al., filed Jun. 10, 1999.
U.S. patent application Ser. No. 09/328,935, Acharya et al., filed Jun. 9, 1999.
U.S. patent application Ser. No. 09/359,831, Acharya et al., filed Jul. 23, 1999.
U.S. patent application Ser. No. 09/359,523, Acharya et al., filed Jul. 23, 1999.
U.S. patent application Ser. No. 09/406,032, Acharya, filed Sep. 27, 1999.
U.S. patent application Ser. No. 09/410,800, Acharya et al., filed Oct. 1, 1999
U.S. patent application Ser. No. 09/126,203, Bawolek et al., filed Jul. 30, 1998.
U.S. patent application Ser. No. 09/258,118, Pazmino et al., filed Feb. 24, 1999.
U.S. patent application Ser. No.09/207,753, Acharya, filed Dec. 8, 1998.
U.S. patent application Ser. No. 09/272,751, Tsai et al., filed Mar. 17, 1999.
U.S. patent application Ser. No. 09/165,511, Acharya et al., filed Oct. 2, 1998.
U.S. patent application Ser. No. 09/199,836, Bawolek et al., filed Nov. 24, 1998.
U.S. patent application Ser. No. 09/320,192, Acharya et al., filed May 26, 1999.
U.S. patent application Ser. No. 09/211,309, Acharya et al., filed Dec. 14, 1998.
U.S. patent application Ser. No. 09/438,091, Acharya et al., filed Nov. 10, 1999.
U.S. patent application Ser. No. 09/342,863, Acharya et al., filed Jun. 29, 1999.
U.S. patent application Ser. No. 09/191,310, Acharya et al., filed Nov. 13, 1998.
U.S. patent application Ser. No. 08/986,461, Acharya et al., filed Dec. 8, 1997.
U.S. patent application Ser. No. 09/258,636, Acharya et al., filed Feb. 26, 1999.
U.S. patent application Ser. No. 09/048,901, Acharya, filed Mar. 26, 1998.
U.S. patent application Ser. No. 09/040,806, Acharya, filed Mar. 18, 1998.
U.S. patent application Ser. No. 09/301,753, Acharya et al., filed Apr. 29, 1999.
U.S. patent application Ser. No. 09/083,383, Acharya et al., filed May 21, 1998.
U.S. patent application Ser. No. 09/109,475, Acharya et al., filed Jul. 2,1998.
U.S. patent application Ser. No. 09/140,517, Acharya, filed Aug, 26, 1998.
U.S. patent application Ser. No. 09/129,728, Acharya, filed Aug. 5, 1998.
U.S. patent application Ser. No. 09/146,159, Acharya, filed Sep. 3, 1998.
U.S. patent application Ser. No. 09/152,703, Acharya, filed Sep. 14, 1998.
U.S. patent application Ser. No. 09/163,022, Acharya et al., filed Sep. 29, 1998.
U.S. patent application Ser. No. 08/978,786, Acharya et al., filed Nov. 26, 1997.
U.S. patent application Ser. No. 09/482,551, Acharya et al., filed Jan. 13, 2000.
U.S. patent application Ser. No. 08/963,525, Acharya, filed Nov. 3, 1997.
U.S. patent applciation Ser. No. 09/482,552, Acharya, filed Jan. 13, 2000.
U.S. patent applciation Ser. No. 08/114,720, Acharya, filed Jul. 13, 1998.
U.S. patent application Ser. No. 09/050,743, Acharya et al., filed Mar. 30, 1998.
U.S. patent application Ser. No. 09/963,097, Dunton et al., filed Nov. 3, 1997.
U.S. patent application Ser. No. 08/986,761, Acharya et al., filed Dec. 8, 1997.
U.S. patent application Ser. No. 09/154,176, Acharya, filed Sep. 16, 1998.
U.S. patent application Ser. No. 08/963,334, Acharya, filed Nov. 3, 1997.
U.S. patent appication Ser. No. 09/130,243, Acharya, filed Aug. 6, 1998.
U.S. patent application Ser. No. 08/963,335, Acharya et al., filed Nov. 3, 1997.
U.S. patent application Ser. No. 08/885,415, Acharya, filed Jun. 30, 1997.
U.S. patent application Ser. No. 09/008,131, Acharaya et al., filed Jan. 16, 1998.
U.S. patent application Ser. No. 09/018,601, Acharya, filed Feb. 4, 1998.
U.S. patent application Ser. No. 09/034,625, Acharya, filed Mar. 4, 1998.

* cited by examiner

R COMPONENT G COMPONENT B COMPONENT

R COMPONENT G COMPONENT B COMPONENT

R'  G'  B'

METHOD OF COMPRESSING A COLOR IMAGE

BACKGROUND

1. Field

This disclosure relates to image compression and decompression and, more particularly, to compressing and decompressing a color image.

2. Background Information

In a variety of situations, having the capability to compress an image is desirable. For example, when transmitting an image over a limited bandwidth communications channel or when storing an image for later retrieval. Likewise, it is desirable to have the capability to compress a color image in this fashion. Although several techniques for the compression of images, including color images, are known, it is desirable to continue to develop processes for compressing images that improve the quality of the reconstructed image and/or improve the efficiency of the compression employed.

SUMMARY

In accordance with one embodiment of the invention, a method of compressing a color image includes the following. The wavelet transform of each of the respective color planes of the color image is computed. One of the respective wavelet transformed color plane frames is encoded. For the other two respective wavelet transformed color plane frames, a prediction coefficient from at least one of subbands of each color plane thereof is computed.

In accordance with another embodiment of the invention, a method of decompressing a compressed color image includes the following. The compressed color image includes at least an encoded frame for one color plane of the color image and prediction coefficients for the other two color plane frames of the color image. The one color plane frame of the color image is reconstructed from the encoded frame. The other two color plane frames of the color image are at least partially reconstructed from the reconstructed one color plane frame and the prediction coefficients.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not obscure the present invention.

As previously discussed, improved techniques are desired for compressing images, particularly color images, such as that provide improved image quality of the reconstructed image and/or improved compression efficiency. For an embodiment of a method of compressing a color image in accordance with the present invention, exploiting the redundancy of the data among the different color plane frames of the color image, such as, for example, the RGB color planes, where an RGB color space format is employed, is desirable. As explained in more detail hereinafter, this particular embodiment in accordance with the present invention exploits intra- as well as inter-color component redundancies to attain improved compression ratios in terms of compression efficiency, while at the same time reducing computational complexity.

Figure 1:
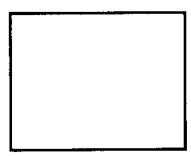
FIG. 1 is a schematic diagram illustrating three color plane frames for a color image to be compressed by an embodiment in accordance with the present invention.
Figure 1:
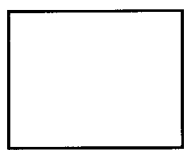
Figure 1:
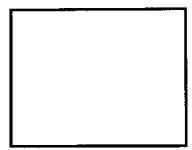

FIG. 1 is a schematic diagram illustrating three color plane frames for a color image, in this particular embodiment, a color image stored in the RGB color space format. It will be appreciated that the invention is not limited in scope to be RBG color space format or a particular dimension or size.

Figure 2:
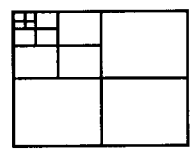
FIG. 2 is a schematic diagram illustrating the color plane frames of FIG. 1 after being wavelet transformed.
Figure 2:
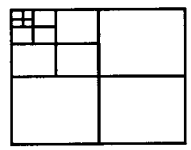
Figure 2:
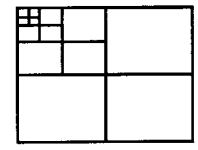
Figure 3:
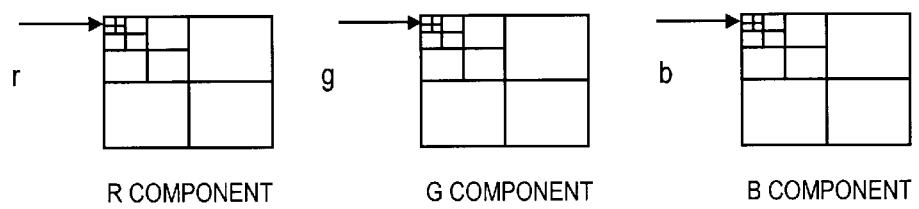
FIG. 3 is a schematic diagram illustrating prediction coefficient computation for an embodiment of a method of compressing a color image in accordance with the present invention.

However, referring to FIG. 1, the wavelet transform of each of the respective color plane frames of the color image is computed. In this particular embodiment, the images are wavelet transformed to four or five levels, as illustrated in FIG. 2, although the invention is not limited in scope in this respect. In alternative embodiments, for example, the images may be transformed to fewer levels or to a greater number of levels.

In this particular embodiment, the G color plane frame is wavelet transformed and then embedded zerotree coded in a fashion as is well-known and typically employed for gray scale images, such as described, for example, in Shapiro, J. M. "Embedded Image Coding Using Zerotrees of Wavelet Coefficinets", IEEE Transactions on Signal Processing, Vol. 41, No. 12, December 1993, pp. 3445–3462. In this particular embodiment, the G color plane frame was employed as the reference color plane frame. It will, of course, be appreciated that the invention is not limited in scope to embedded zerotree coding this particular color plane frame. For example, alternatively, the wavelet transformed frame for the R color plane or the B color plane may be employed as the reference frame. Likewise, where other color space formats are employed, the frames for other color planes will be embedded zerotree encoded.

Two prediction coefficients coeff_r and coeff_b in this particular embodiment, are then computed for the R and B color planes respectively. In this particular embodiment, these two coefficients are calculated using the wavelet coefficient values obtained for the smallest LL subband of the wavelet transformed frames for the two color planes, R and B. The mean values (g, r and b) of the wavelet coefficients for these respective regions, as well as for the corresponding region in the G color plane frame, are employed to calculate the coefficients in accordance with the following equations:

coeff_r=r/g  coeff_b=b/g

It is noted that depending upon a particular application, the embedded zerotree encoded G color plane frame or component and the two coefficients calculated for the R and B components are sufficient to compress the color image for an embodiment in accordance with the present invention. For example, where a particularly limited bandwidth communications channel is employed or a particularly limited amount of memory space is available, compression may be complete. However, where greater or improved quality is desired in terms of the reconstructed image, additional processing, as described in more detail hereinafter, may be employed to compress the image in alternative embodiments of the invention. Where additional compression processing is employed, a partial error subband of the wavelet transformed R color plane frame and B color plane frame may be computed, as described below. Likewise, in still another embodiment, for still better prediction, and further compression similar coefficients may be calculated for each of the subbands for the R and B planes.

Figure 4:
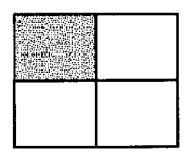
FIG. 4 is a schematic diagram illustrating computation of a partial error subframe for an embodiment of a method of compressing a color image in accordance with the present invention.

FIG. 4 is a schematic diagram illustrating the prediction errors in the subbands for the wavelet transformed R color plane frame from the color image of FIG. 1. The shaded region contains useful signal information which it may be desirable to code and transmit to achieve better quality in the reconstructed image. The remaining regions in FIG. 4 are simply ignored by approximating the corresponding error coefficients to zero. The coefficient coeff_r for the R color plane, as computed above, is multiplied with the corresponding pixel signal value in the wavelet transformed G color plane frame and subtracted from the pixel signal value in the wavelet transformed R color plane frame in that corresponding location to produce a partial error signal value. This is illustrated symbolically by the following equation.

R_error $(i, j)$=$R(i, j)$−coeff_r*$G(i, j)$∀$i, j$ in the shaded region

This produces what is referred to in this context as a partial error subframe. The partial error subframe for the wavelet transformed R color plane frame is entropy coded in this particular embodiment, although the invention is not limited in scope in this respect. For example, alternatively, embedded zero tree coding may be employed or other types of compression, such as to reduce redundant signal information. Likewise, entropy coding is well-known and will not be discussed in detail here.

A similar approach is applied to the wavelet transformed B color plane in accordance with the following equations.

B_error $(i, j)$=$B(i, j)$−coeff_b*$G(i, j)$∀$i, j$ in the shaded region

Likewise, this partial error subframe is also entropy coded, although, again, the invention is not limited in scope in this respect. Therefore, in this particular embodiment, an embedded zerotree encoded G color plane frame, the two prediction coefficients, respectively for the R plane frame and the B plane frame, and the two partial error subframes, respectively for the R plane frame and the B plane frame may be transmitted across a communications channel or, alternatively, stored in memory, such as non-volatile memory, for later retrieval. For further compression, coeff_b and coeff_r are to be calculated for each of the subbands of the R and B color planes. The error matrices are then evaluated using the corresponding values of coeff_r and coeff_b depending on the subbands and the wavelet transformed G color plane. Therefore, in this particular embodiment, an embedded zerotree encoded G color plane frame, the coefficients for the different subbands in the R plane frame and the B plane frame, and the two partial error subframes, respectively for the R plane frame and the B plane may be transmitted across a communications channel or, alternatively, stored in memory, such as non-volatile memory, for later retrieval.

Figure 7:
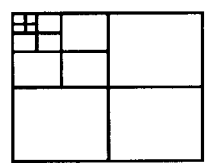
FIG. 7 is a schematic diagram illustrating a computation for an embodiment of a method of decompressing a color image in accordance with the present invention.
Figure 7:
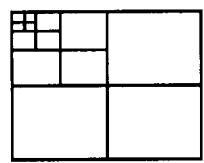
Figure 7:
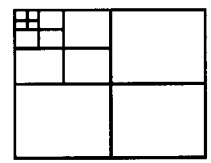

Once a compressed color image is received at the receiving end of a communication channel or, alternatively, retrieved from memory, it is desirable that it be decompressed. Of course, the decompression will depend upon the particular approach employed to compress the image. For example, where a particularly limited bandwidth communication channel or a small amount of memory is available, it is possible that the compressed color image includes only an embedded zerotree encoded frame for one color plane frame of the color image and two coefficients for the other two color plane frames of the color image. In this particular situation, an embodiment of a method of decompressing a compressed color image in accordance with the present invention includes reconstructing the one color plane frame, for example, in this particular embodiment, the G color plane frame, of the color image from the embedded zerotree encoded frame. Then, of course, in this embodiment, it is the wavelet transformed G' color plane frame that is reconstructed. This is accomplished by inverse zero tree encoding the embedded zerotree encoded frame and stored it, such as G' in FIG. 7. Once the wavelet transformed G color plane frame has been reconstructed as G', it may be employed to reconstruct the wavelet subbands of the other two color plane frames of the color image. First, the approximation of the these subbands may be created in accordance with the following equations.

$R'(i, j)$=$G'(i, j)$*coeff_r $B'(i, j)$=$G'(i, )$*coeff_b

As illustrated, the two coefficients for the R and B frames are multiplied by the corresponding components in the wavelet transformed G' color plane frame to obtain the desired pixel signal values in R' and B' wavelet transformed color plane frames.

Depending upon the desired amount of processing and desired quality of the reconstructed image, at this point the wavelet transformed G' color plane frame and that of the R' and B' color plane frames may be employed to reconstruct the color image by inverse wavelet transforming the frame and sub-frames. This approach may, for example, be employed where partial error sub-frames have been computed and transmitted or stored, but it is desired to reduce computational complexity when decompressing the color image because the image quality is adequate and, therefore, the partial error sub-frames are not employed. However, if in an alternative embodiment, it is desired to employ the partial error sub-frames, then before inverse wavelet transforming the frame and subframes of the R' and B' color space frames, the frames are processed in accordance with the following equations.

new $R(i, j)$=$R'(i, j)$+R_error$(i, j)$ new $B(i, j)$=$B'(i, j)$+B_error$(i, j)$ ∀$i, j$ in the shaded region As illustrated, the corresponding pixel signal values of the partial error subframes are added to the corresponding pixel signal values in the sub-bands for the R' and B' color frames. If coefficients for all the subbands for both the R and B planes have been transmitted then the R' and B' planes are reconstructed with the following equations.

$$R'(i, j)=G'(i, j)*coeff\_r$$

$$B'(i, j)=G'(i, j)*coeff\_b$$

where the values of coeff_r and coeff_b depend on the subband of calculation.

For better reconstruction quality the partial error frames are then added to the R' and B' components as mentioned above for the previous embodiment.

Figure 5:
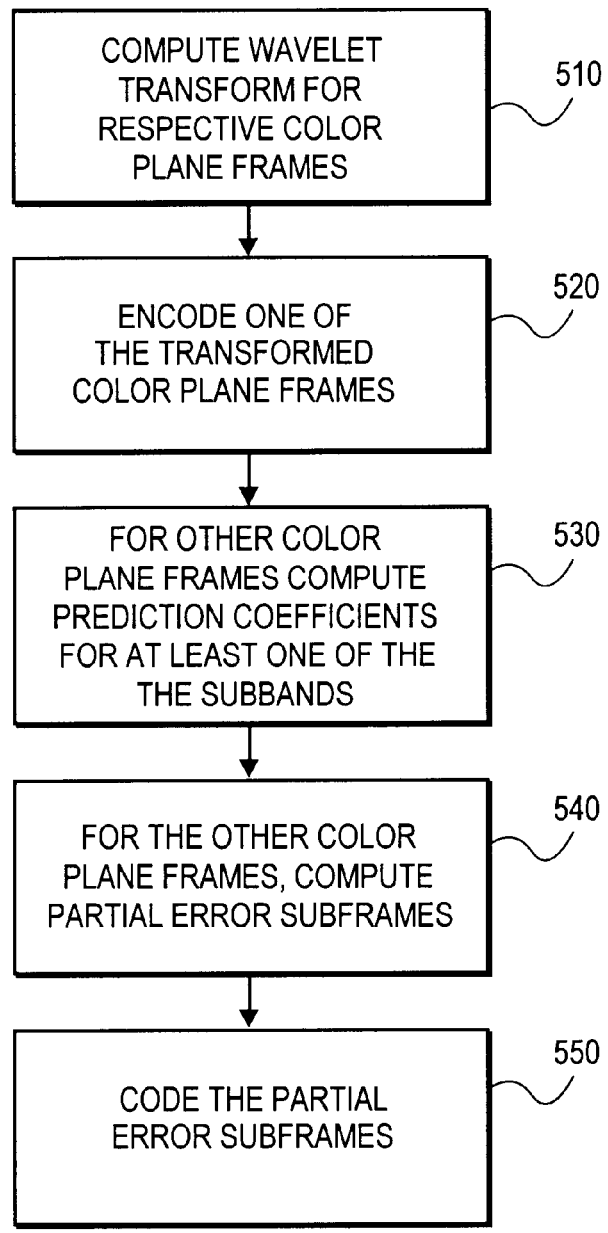
FIG. 5 is a flowchart illustrating an embodiment of a method of compressing a color image in accordance with the present invention.
Figure 6:
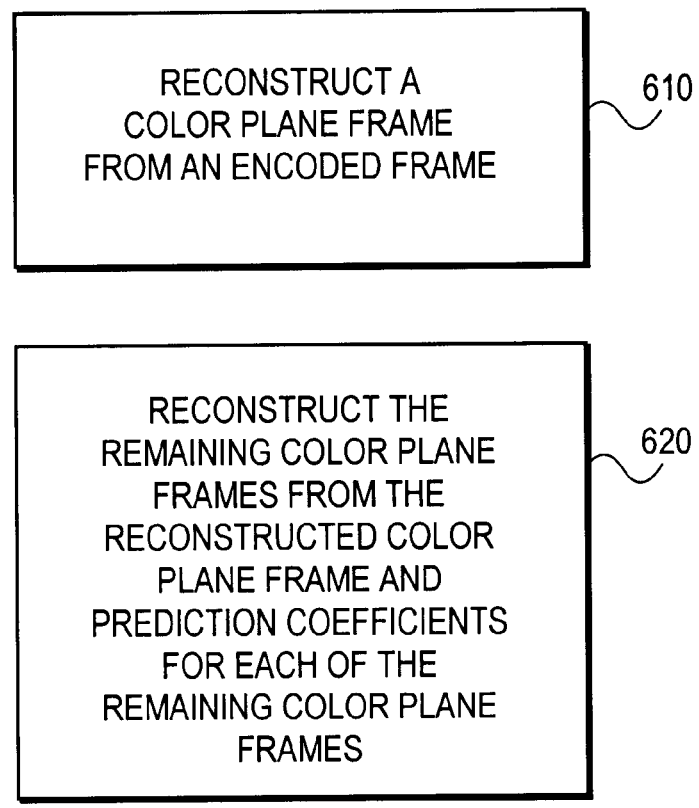
FIG. 6 is a flowchart illustrating an embodiment of a method of decompressing a compressed color image in accordance with the present invention.

FIGS. 5 and 6 are flowcharts illustrating method embodiments in accordance with the invention, such as previously described. Although, as previously discussed, the invention is not limited in scope to these particular embodiments, these embodiments previously described, nonetheless, provides a number of advantages. For example, in the embodiment including partial error subframes, even then the amount of signal information transmitted or stored is not significant, comprising the scale factors or coefficients, two partial error subframes and an embedded zerotree coded color frame. Likewise, when the color image is being compressed, there is no need to compute the HL, LH and HH components for the R and B color frames for the levels which fall outside the shaded region in FIG. 4. This drastically reduces the computational complexity of compressing a color image. Likewise, the calculation of the scale factors/coefficients does not incur significant, additional computational burden and, as previously alluded to, encoding and/or decoding may be user selectable in that, depending upon the availability of bandwidth and/or storage and/or the desired level of image quality, different amounts of compression and decompression may be employed. Likewise, further compression may be achieved by neglecting the errors in the HH components of each level of decomposition. Of course, in such an embodiment, while computational efficiency is improved, the quality of the image may be sacrificed, which may be desirable, depending on the particular application.

It will, of course, be appreciated that the invention is not restricted in scope to a particular embodiment or implementation. For example, the foregoing approach, as one example of an approach in accordance with the invention, may be implemented in hardware, in software, in firmware, and/or any combination thereof. Again, intended merely as examples that do not limit the scope of the invention, an embodiment may comprise an imager including hardware, such as integrated circuit chips, that implement the foregoing. Alternatively, the imager may be coupled to a computing platform that includes software capable of implementing the foregoing. Likewise, a digital camera coupled to a desktop personal computer, for example, may implement an embodiment. Likewise, an embodiment may omit an imager or camera. Furthermore, these implementations in hardware and software may, of course, deviate from the foregoing and still be within the scope of the present invention.

For embodiments that are at least partially implemented in software, such as, for example, the previously described embodiment, such software may reside on a storage medium, such as, for example, random access memory, a CD ROM, a floppy disk, or a hard drive, such that instructions are stored, which, when executed, such as by a computing platform, such as a PC or other computing device, the system is capable of executing the instructions to result in the interpolation of color pixel signal values from a subsampled image. Likewise, such software may reside in firmware also, such as in flash memory or EEPROM, for example.

While certain features of the invention have been illustrated and described herein, many modifications, substitutions, changes and equivalents will now occur to those skilled in the art. For example, an embodiment in accordance with the invention may be employed to transmit compressed color images over packet or circuit switched communication channels. It is, therefore, to be understood that the appended claims are intended to cover all such modifications and changes as fall within the true spirit of the invention.

What is claimed is:

1. A method of compressing a color image comprising:

computing a wavelet transform of each of an R, a G, and a B color plane frames of the color image;

encoding one of the respective wavelet transformed color plane frames;

for the other two respective wavelet transformed color plane frames, computing a prediction coefficient and a partial error subframe from at least the other two respective wavelet transformed color plane frames, wherein the only subband of the other two respective wavelet transformed color plane frames used to compute the prediction coefficient and the partial error subframe is an LL subband; and coding the partial error subframes.

2. The method of claim 1, wherein encoding the one of the respective wavelet transformed color plane frames comprises embedded zero tree encoding the one of the respective wavelet transformed color plane frames.

3. The method of claim 2, wherein cog the partial error subframes comprises entropy coding the partial error subframes.

4. The method of claim 1, wherein the one of the respective wavelet transformed color plane frames comprises the G color plane wavelet transformed frame.

5. The method of claim 4, wherein the other two color plane wavelet transformed frames comprise a R and a B color plane wavelet transformed frame;

wherein the partial error subframes are computed substantially in accordance with the following equation $$R\_error(i, j)=R(i, j)-coeff\_r*G(i, j)\ B\_error(i, j)B(i, j)-coeff\_b*G(i, j) \qquad \forall i, j \text{ in a given region}$$

where:

R(i, j) is the pixel signal value of the wavelet transformed R color plane;

coeff_r is the mean value of the wavelet coefficients in a region of the R color plane divided by that of the G color plane;

G(i, j) is the pixel signal value of the wavelet transformed G color plane;

B(i, j) is the pixel signal value of the wavelet transformed B color plane;

color coeff_b is the mean value of the wavelet coefficients in a region of the B color plane divided by that of the G color plane.

6. The method of claim 1, and further comprising:

transmitting the encoded subframes and the coefficients over a communication chancel.

7. The method of claim 6, wherein the communication channel comprises a circuit switched communication channel.

8. The method of claim 6, wherein the communication channel comprises a packet switched communication channel.

9. The method of claim 1, and further comprising:

storing the encoded subframes and the coefficients in a memory.

10. The method of claim 9, wherein the memory comprises a nonvolatile memory.

11. The method of claim 1, wherein the one of the respective wavelet transformed color plane frames comprises the R color plane wavelet transformed frame.

12. The method of claim 1, wherein the one of the respective wavelet transformed color plane frames comprises the B color plane wavelet transformed frame.

13. A method of compressing a color image comprising:
computing a wavelet transform of each of an R, a G, and a B color plane frames of the color image;
embedded zero tree encoding one of the respective wavelet transformed color plane frames;
for the other two respective wavelet transformed color plane frames, computing a prediction coefficient for all the subbands thereof; and
computing a partial error subframe at least the other two respective wavelet transformed color plane frames, wherein the only subband of the other two respective wavelet transformed color plane frames used to compute the partial error subframe is on LL subband.

14. The method of claim 13, wherein the coefficients are computed as follows:

$$\text{coeff\_r} = r/g \quad \text{coeff\_b} = b/g$$

where:
r is the mean value of the wavelet coefficients in a region of the R color plane;
b is the mean value of the wavelet coefficients in the region of the B color plane;
g is the mean value of the wavelet coefficients in the region of the G color plane.

15. The method of claim 13, wherein the one of the respective wavelet transformed color plane frames comprises an G color plane wavelet transformed frame.

16. The method of claim 15, wherein the other two wavelet transformed color plane fries comprise a R and a B wavelet transformed color plane frame.

17. The method of claim 13, and further comprising:
transmitting the embedded zero tree encoded subframe and the coefficients over a communication channel.

18. The method of claim 17, wherein the communications channel comprises a circuit switched communication channel.

19. The method of claim 17, wherein the communication channel comprises a packet switched communication channel.

20. The method of claim 13, and further comprising:
storing the embedded zero tree encoded subframes and the coefficients in a memory.

21. The method of claim 13, and further comprising:
embedded zero tree encoding the partial error subframes.

22. The method of claim 13, wherein the partial error subframes are computed substantially in accordance with the following equation:

$$R\_\text{error}(i, j) = R(i, j) - \text{coeff\_r} * G(i, j)$$

$$B\_\text{error}(i, j) = B(i, j) - \text{coeff\_b} * G(i, j) \quad \forall i, j \text{ in a given region}$$

where:
$R(i, j)$ is the pixel signal value of the wavelet transformed R color plane;
coeff\_r is the mean value of the wavelet coefficients in a region of the R color plane divided by that of the G color plane;
$G(i, j)$ is the pixel signal value of the wavelet transformed G color plane;
$B(i, j)$ is the pixel signal value of the wavelet transformed B color plane;
coeff\_b is the mean value of the wavelet coefficients in a region of the B color plane divided by that of the G color plane.

23. The method of claim 13, wherein the one of the respective wavelet transformed color plane frames comprises the R color plane wavelet transformed frame.

24. The method of claim 13, wherein the one of the respective wavelet transformed color plane frames comprises the B color plane wavelet transformed frame.

25. An article comprising:
a storage medium, having stored thereon instructions, which, when executed by a system capable of executing the instructions, result in compressing a color image by:
computing a wavelet transform of each of an R, a G, and a B color plane frames of the color image;
encoding one of the respective wavelet transformed color plane frames;
for the other two respective wavelet transformed color plane frames, computing a prediction coefficient and a partial error subfrane from at least the other two respective wavelet transformed color plane frames, wherein the only subband of the other two respective wavelet transformed color plane frames used to compute the prediction coefficient and the partial error subframe is an LL subband; and
coding the partial error subframes.

26. The article of claim 25, wherein the instructions, when executed, further result in encoding the one of the respective wavelet transformed color plane frames by embedded zero tree encoding the one of the respective wavelet transformed color plane frames.

27. The article of claim 25, wherein the instructions, when executed, further result in coding the partial error subframes by entropy coding the partial error subframes.

28. The article of claim 25, wherein the one of the respective wavelet transformed color plane frames comprises the R color plane wavelet transformed frame.

29. The article of claim 25, wherein the one of the respective wavelet transformed color plane frames comprises the G color plane wavelet transformed frame.

30. The article of claim 25, wherein the one of the respective wavelet transformed color plane frames comprises the B color plane wavelet transformed frame.

* * * * *

UNITED STATES PATENT AND TRADEMARK OFFICE
CERTIFICATE OF CORRECTION

PATENT NO. : 6,798,901 B1
DATED : September 28, 2004
INVENTOR(S) : Acharya et al.

Page 1 of 1

It is certified that error appears in the above-identified patent and that said Letters Patent is hereby corrected as shown below:

Column 6,
Line 27, delete "cog" and insert -- coding --.
Line 56, delete "chancel" and insert -- channel --.

Column 7,
Line 19, delete "on" and insert -- an --.
Line 35, delete "fries" and insert -- frames --.

Column 8,
Line 32, "subfrane" and insert -- subframe --.

Signed and Sealed this

Seventh Day of June, 2005

JON W. DUDAS
*Director of the United States Patent and Trademark Office*